Feb. 6, 1940.  C. B. MOORE  2,189,289
MEASURING APPARATUS
Filed June 1, 1936  3 Sheets-Sheet 2
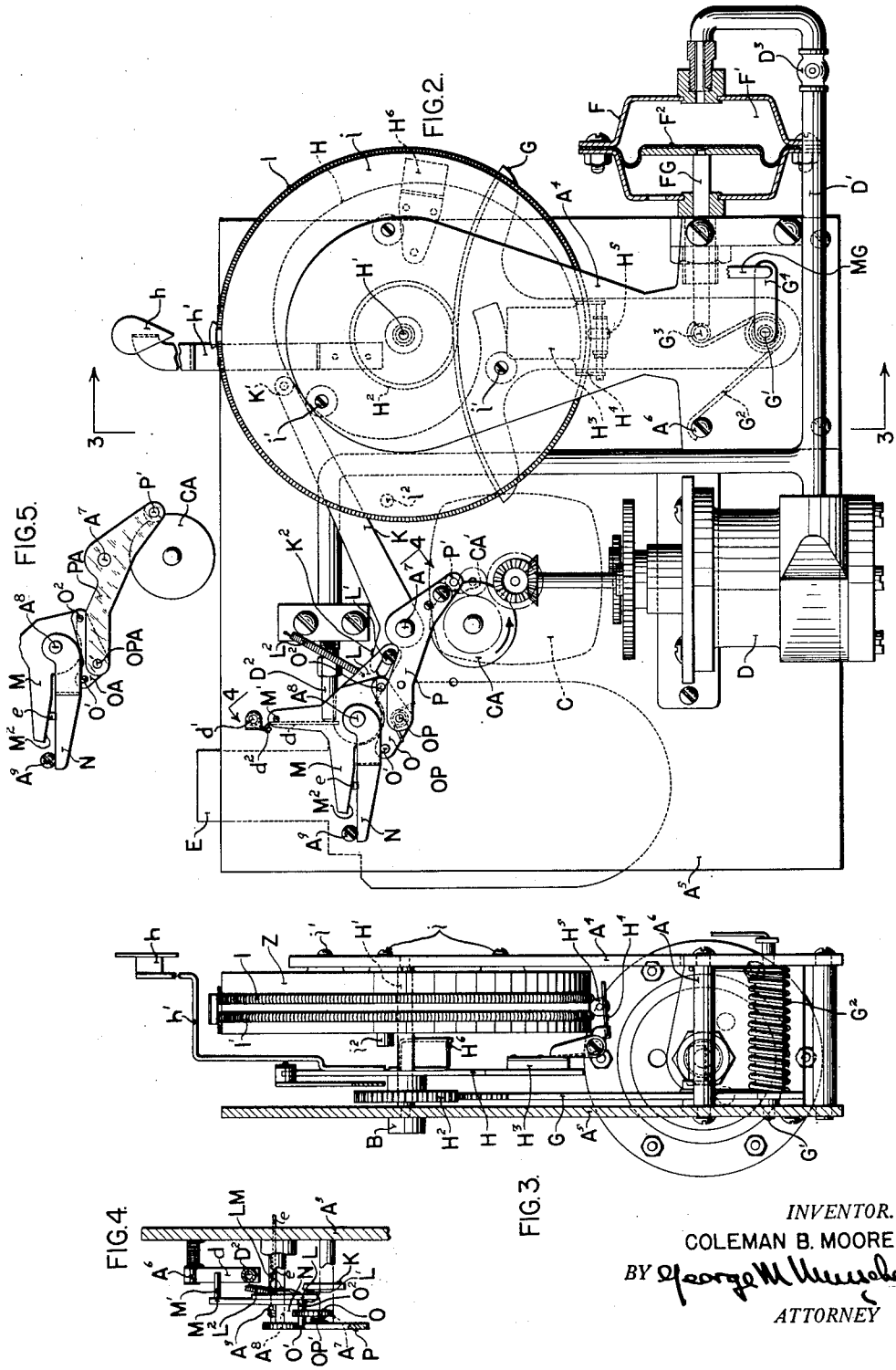
INVENTOR.
COLEMAN B. MOORE
BY George M. Murchany
ATTORNEY

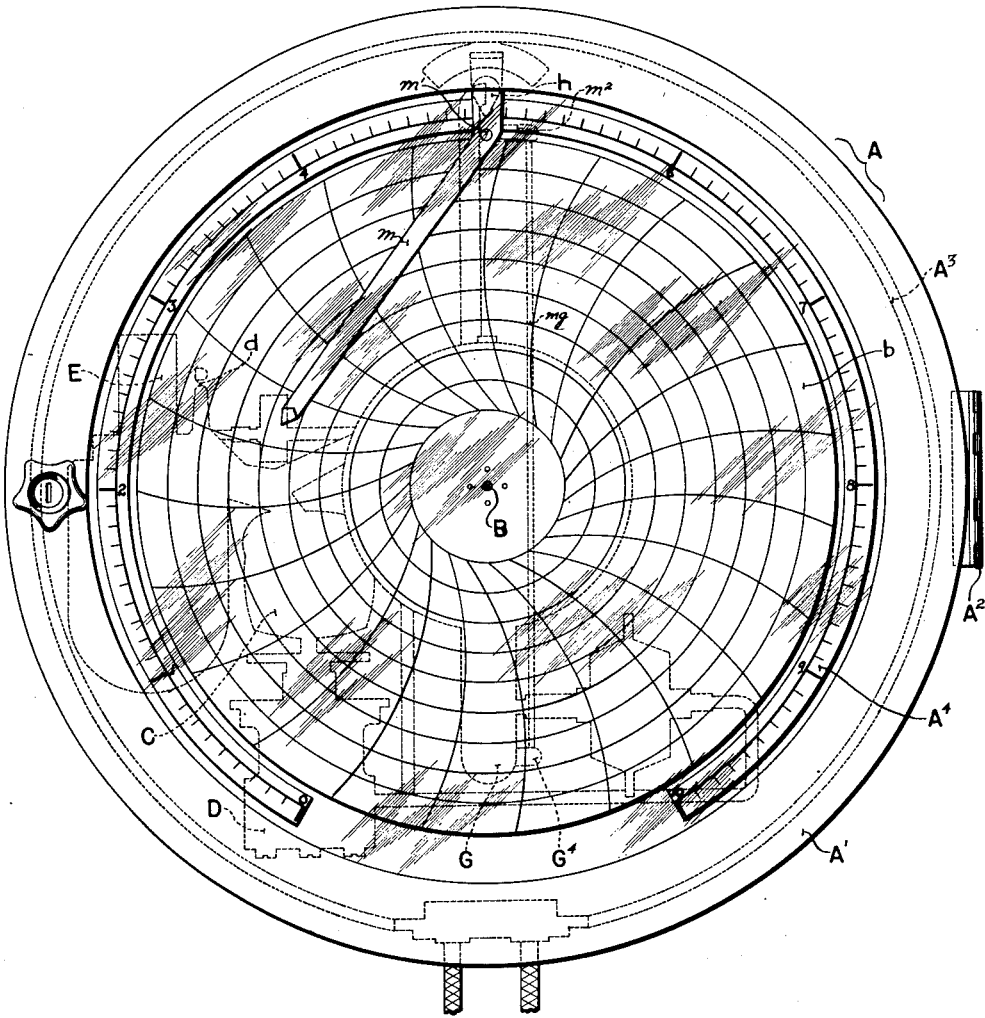

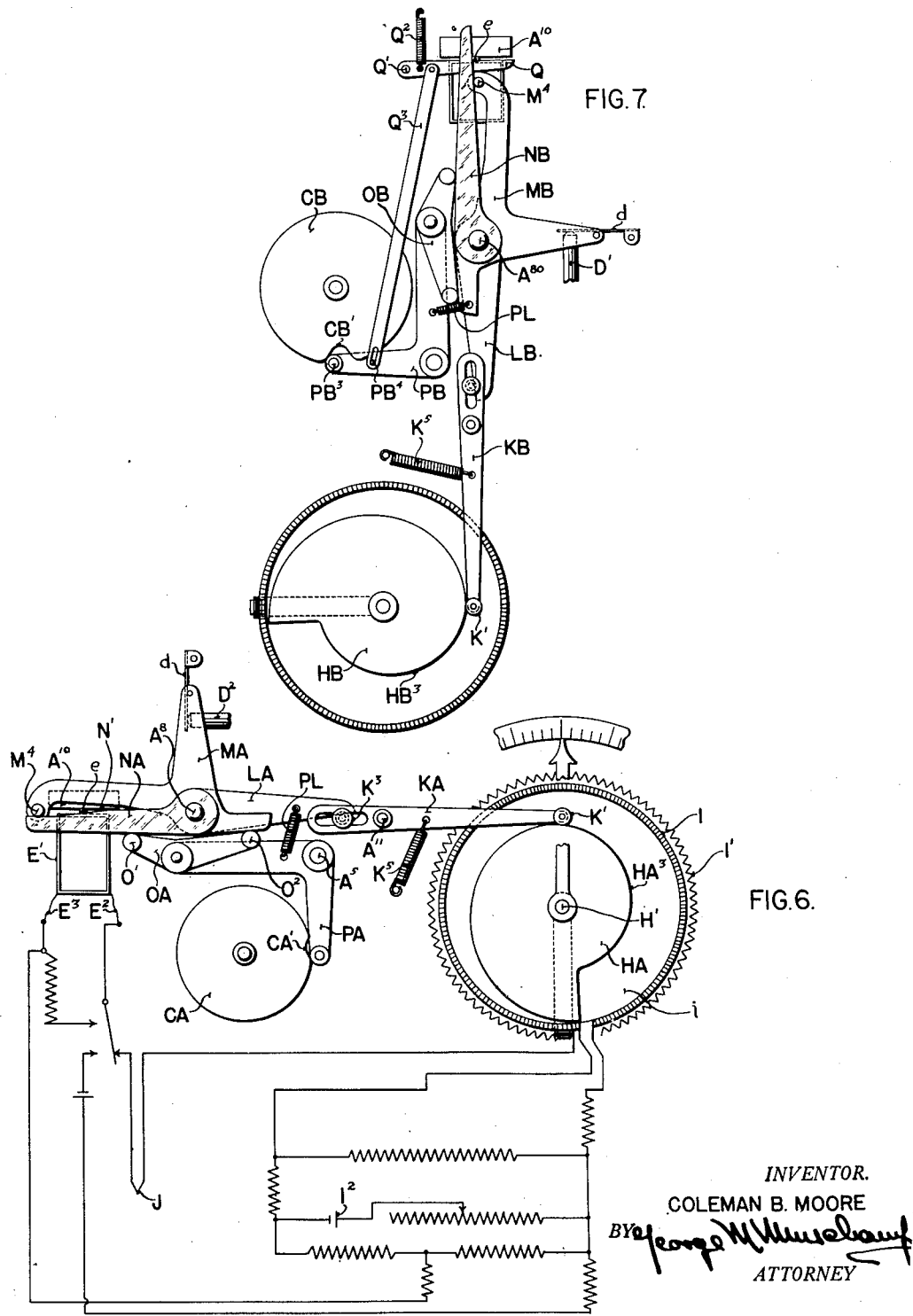

Patented Feb. 6, 1940

2,189,289

UNITED STATES PATENT OFFICE 2,189,289

MEASURING APPARATUS

Coleman B. Moore, Carroll Park, Pa., assignor to The Brown Instrument Company, Philadelphia, Pa., a corporation of Pennsylvania Application June 1, 1936, Serial No. 82,850

27 Claims. (Cl. 121—41)

The general object of the present invention is to provide improvements in self-balancing potentiometer instruments adapted for use in measuring a variable electro-motive force, which may be a thermocouple voltage varying with a furnace temperature, or may be a voltage which is the function of a rate of speed, a pressure or some other physical quantity or condition.

The present invention comprises novel potentiometric rebalancing means, characterized primarily by the fact that the rebalancing action is effected by a motor or power device energized for operation in one direction or the other to effect a corresponding rebalancing operation by an adjustment of a controller which is automatically effected by means controlled by the deflection, in response to the potentiometer unbalance, of the galvanometer element of the instrument, said controller being given a return or reverse adjustment to deenergize the motor and terminate the rebalancing operation, by means actuated by the said motor or power device in the rebalancing operation of the latter.

In the preferred form of the invention, the motor or power device includes a fluid pressure motor element and is energized for operation in each direction, and is deenergized, by varying the pressure of the pressure fluid acting on said motor element. The fluid pressure acting on the motor element is controlled by a so-called flapper valve which is adjusted in one direction or the other from a normal position to initiate each rebalancing operation, by means controlled by the deflection of the galvanometer, and which is given a return adjustment, terminating the rebalancing operation by, and as a result of, the operation of the motor element in effecting the rebalancing operation.

In practice, the extent of the initial adjustment of the flapper valve is suitably varied in accordance with the magnitude of the galvonometer deflection, which increases as the extent of rebalancing action needed is increased, and the increase in the extent of the initial adjustment, results in a corresponding increase in rebalancing action necessary to return the flapper valve.

In the preferred practical form of the invention, the pressure fluid is air put under pressure by an air compressor driven by an electric motor, which with the compressor, is located in the instrument casing, and the electric motor directly actuates the mechanical relay provisions through which the flapper valve is periodically adjusted, in accordance with the galvanometer deflection, and may also serve other instruments purposes, and, in particular, may drive the travelling record disc or strip on which the instrument, if a recording instrument as is usual, makes a record of the value of the quantity measured.

In addition to its more general features, the invention comprises novel features of construction and arrangement, contributing to the compactness, simplicity, effectiveness, and reliability of the instrument mechanism.

While the general principles of the invention are adapted to use in strip chart recording instruments and other instruments having housings rectangular in outline, the invention is of especial utility because of the ready maner in which its operative parts may be assembled in a compact arrangement adapted for use in a so-called circular chart instrument comprising a housing in the general form of a short cylinder.

Of the drawings:

Fig. 1 is a front elevation of an instrument;

Fig. 2 is a front elevation with parts broken away and in section, of operating parts of the instrument of Fig. 1 on a scale larger than that of Fig. 1;

Fig. 3 is a partial section, taken on the line 3—3 of Fig. 2;

Fig. 4 is an elevation of a portion of the apparatus shown in Fig. 2, projected on the plane indicated by the line 4—4 of Fig. 2;

Fig. 5 is an elevation of a modification of a portion of the apparatus shown in Fig. 2;

Fig. 6 illustrates a modification of a portion of the apparatus shown in Fig. 2, in association with a diagrammatically illustrated potentiometer circuit arrangement; and Fig. 7 is an elevation of a modification of the apparatus shown in Fig. 6.

The instrument A shown in Fig. 1, and comprising mechanism illustrated in Figs. 2, 3, and 4, is a circular chart potentiometer instrument, the operating parts of which are enclosed in a cylindrical casing or housing, having a front door A' connected by a hinge A² to the casing body A³. The instrument A is provided at its front side with a stationary circular scale A⁴ on which the value of the quantity measured is indicated by a movable index $h$. The instrument also comprises a pen arm $m$ deflecting about an axis $m'$ adjacent the periphery of the instrument, and tracing a record of the value of the quantity measured on a chart disc $b$. The latter is rotated by a chart driving element B, the latter being rotated through suitable speed reducing gearing by an electric motor C located within the instrument casing. The motor C also drives an air compressor D of the gear pump, or other suitable type, supplying air under pressure to operate the relay mechanism through which the potentiometer circuit is rebalanced, the relay mechanism, hereinafter described in detail, as well as the compressor D, being located in the instrument casing. The motor C also rotates a cam CA periodically adjusting a flapper valve $d$ through which the compressor air delivery pressure is varied under control of, and in correspondence with the deflection of the pointer $e$ of the instrument galvanometer E, as required to effect potentiometer rebalancing operations of the relay mechanism tending to return the galvanometer pointer $e$ to its neutral position following any deflection of the pointer from that position.

The piping into which the compressor D delivers air under pressure, includes a branch D' supplying air under pressure to the working chamber F' of a pneumatic, or fluid pressure motor element F, of the potentiometer rebalancing mechanism, and comprises a second branch terminating in a bleed nozzle or vent $D^2$. The discharge of air through the nozzle $D^2$ determines the compressor discharge pressure, and thereby the pressure in the chamber F', and is controlled by movements of the flapper $d$ toward and away from the end of the nozzle $D^2$. As shown, the flapper $d$ is pivoted at $d'$, and is biased by a spring $d^2$, for movement toward the nozzle $D^2$, so that the flapper has an inherent tendency to prevent discharge through the nozzle $D^2$ and hence to the maintenance of miximum pressure in the chamber F'. The flapper $d$ is periodically adjusted relative to the nozzle $D^2$, hereinafter explained, to effect rebalancing operations.

The motor element F includes a diaphragm $F^2$ forming a movable wall of the pressure chamber F' and externally exposed to the pressure of the atmosphere. The diaphragm is connected at its center to, and gives longitudinal movements to, a plunger or rod FG through which the wall $F^2$ controls the angular position of a gear segment G. The latter is journalled on a shaft $G'$, supported at its ends in plates $A^4$ and $A^5$ mounted in the instrument casing and forming parts of the frame work in which operating parts of the instrument mechanism are mounted. The segment G is biased for movement in the clockwise direction, as seen in Fig. 2, by a spring $G^2$ having its body coiled about the shaft $G'$, and having one end anchored to a framework post $A^6$ extending between the plates $A^4$ and $A^5$, and having its opposite end connected to a stud or projection $G^3$ from the segment G, which also serves at the abutment engaged by the end of the plunger or rod FG. Preferably, the spring $G^2$ is long enough, so that its tension is not significantly changed as the gear segment G moves from one end to the other of its range of movement, so that the pressure in the chamber F' required to hold the segment G stationary, is substantially the same in all positions of the segment.

The gear segment G is in mesh with a spur gear $H^2$ fixed on a shaft $H'$ journalled at its ends in the frame plates $A^4$ and $A^5$ and carrying a cam member H. The latter, in addition to its hereinafter mentioned cam function, carries the supporting arm $h'$ for the previously mentioned index $h$, and supports a block or bracket $H^3$ forming a support for an arm $H^4$ which gives movements angularly about the shaft $H'$, to a contact $H^5$ which is the slide wire resistance engaging contact of the potentiometer circuit. In the construction shown, the arm $H^4$ forms a resilient support for the contact $H^5$ holding the latter against two slide wire resistances I and I' extending circularly about the shaft $H'$, and for which the contact $H^5$ forms a conducting bridge. The resistances I and I' are mounted side by side at the periphery of a circular support $i$ of insulating material, which is coaxial with the shaft $H'$ and is supported by screws $i'$ from the supporting frame plate $A^4$.

With the arrangement illustrated, the full stroke or range of angular movement permitted the member G, corresponds to a nearly complete revolution of the cam member H. Over-movement of the latter at either limit of its angular movement is prevented by the engagement of a projection $H^6$ secured to the member H with a stop pin $i^2$ carried by the resistance support $i$.

The precise form of the potentiometer circuit arrangement of which the resistance I and I' form parts, is not a feature of the present invention, but that arrangement may well be of the split potentiometer type shown in Fig. 6. As that form of potentiometer circuit is well known and in extensive use in the comercial "Brown Potentiometer," and is shown in prior patents, it need not be described in detail herein. It is noted, however, that in the diagram shown in Fig. 6, a current flow of predetermined magnitude through the resistance I, is maintained by a battery or other source of current $I^2$, and that one terminal $E^2$ of the galvanometer winding $E'$ is connected to the movable bridging contact $H^5$ through the thermocouple J or other source of current of electro-motive force to be measured. The second terminal $E^3$ of the winding $E'$ is so connected to the potentiometer circuit proper that as the voltage of the thermocouple J changes in one direction or the other, a suitable movement of the bridging contact $H^5$ to the right or left, as seen in Fig. 6, will make the portion of the total potential drop in the resistance I, which is impressed on the galvanometer terminals $E^2$ and $E^3$ in opposition to the thermocouple voltage, equal to the latter, thereby reducing the current flow through the galvanometer winding E to zero, and bringing the pointer $e$ into its neutral position. With the arrangement shown in Fig. 2, the movement of the contact $H^5$ required to balance the potentiometer circuit, on an increase or decrease in the E. M. F. measured, is in the clockwise or counter-clockwise direction, respectively.

With the potentiometer balanced so that the galvanometer pointer $e$ is in its neutral or zero position, the angular position of the contact $H^5$ and member H, corresponds to the value at the time, of the quantity measured, and is indicated on the scale $A^3$ by the index $h$ carried by the member H. As the angular position of the segment G is definitely related at all times to the angular position of the member H, I conveniently adjust the recording pen arm by means of an arm $m^2$ connected to the pen arm, and a link $mg$ connecting the arm $m^2$ to an arm $G^4$ carried by the gear segment shaft $G'$. In the arrangement shown, the range of angular movement of the pen arm is about the same as that of the member G, so that the arms $m^2$ and $G^4$, which extend radially away from the pivots $m'$ and $G'$, respectively, may be aproximately the same length, and may always be approximately parallel to one another.

The angular adjustment of the edge cam H effects corresponding angular adjustments of a lever K journalled on a supporting pivot $A^7$ carried by the plate $A^5$, the lever K carrying an anti-friction roller $K'$ engaging the edge $H^3$ of the cam H, which is generally spiral in form. The lever K exercises a controlling effect on the position of the flapper valve $d$, through a lever L journalled on a pivot $A^8$ carried by the frame plate $A^5$. The lever L is provided with an abutment or projection $L'$, shown as mounted for adjustment radially of the pivot $A^8$ in a slot in the lever L and projecting laterally from the latter into position for engagement by a short arm $K^2$ of the lever K. The projection $L'$ is constantly held against the lever arm $K^2$, and the lever L is constantly biased for movement in the counter-clockwise direction about the pivot $A^8$, by a bias spring $L^2$. The lever L acts on the flapper valve $d$ through a lever member M, also journalled on the pivot $A^8$, and carrying a pin projection $M'$ engaging the flapper $d$ and moving the latter away from, or permitting it to approach the nozzle $D^2$, accordingly, as the lever M is turned in the counter-clockwise or in the clockwise direction, respectively. A yielding connection, shown as comprising a friction washer LM between the levers L and M, tends to cause angular movement of one to be shared by the other, but yields to permit relative angular movement of the two levers under certain conditions.

The lever M includes an arm normally above the galvanometer pointer $e$, and having its lower edge $M^2$ periodically brought into engagement with the pointer which is then gripped between the edge $M^2$ and the upper edge of a third lever N. The latter is also journalled on the pivot $A^8$, and has a gravitational bias for counter-clockwise movement out of its pointer engaging position. In its pointer engaging action, the lever N engages and is held against further clockwise motion by a projection $A^9$ from the frame plate $A^5$, and has its upper edge parallel to, and slightly above the plane of deflection of the pointer $e$, which is then bent out of its deflection plane and would not be free to deflect, even though not engaged at its upper side by the edge $M^2$ of the lever M.

The pointer $e$ is periodically gripped between the levers N and M, by means of a lever O connected by a supporting pivot OP to a lever P. The latter is journalled on the pivot $A^7$, and is angularly adjusted by the previously mentioned cam CA which is constantly rotated by the motor C. The lever P has a bias for movement in the clockwise direction, and the cam CA is in the form of a disc provided at its periphery with a shallow peripheral notch $CA'$ (see Fig. 6), into which a lateral projection $P'$, adjustably secured to the lever P, enters once in each revolution of the cam CA. Except when the angular position of the cam CA is such that the notch $CA'$ receives the projection $P'$, the latter rides on the un-notched portion of the edge of the cam CA, and the lever P is therefore held in a position in which the lever O is out of operative engagement with the levers N and M. The lever O carries lateral projections or pins $O'$ and $O^2$, at opposite sides of the pivot support OP. A bias spring $OP'$ acting between the levers O and P, tends to turn the lever O clockwise about the pivot OP, and thereby hold the lever O in such position, that when the lever P is given a clockwise adjustment as the projection $P'$ enters the cam notch $CA'$, the pin $O'$ engages the lever N and moves the latter into engagement with the stop $A^9$ before the pin $O^2$ operatively engages the edge $M^3$ of the lever M.

The direct effect of each operative engagement of the pin $O^2$ with the lever M is to press the lever edge $M^2$ firmly against the galvanometer pointer $e$ while the latter is in engagement with the lever N. Such engagement of the edge $M^2$ with the pointer $e$ may, or may not, require, and result from, some angular adjustment of the lever M effected by the operative engagement therewith of the pin $O^2$, dependent on the relative positions of the pointer $e$ and lever M when such engagement occurs. If the pointer $e$ is then in its neutral position, the lever M will also be in a neutral or normal position, if the apparatus is properly calibrated, and the lever N will then bring the pointer $e$ into contact with the edge $M^2$, without giving movement to the lever M, and the latter will not be moved on its corresponding operative engagement with the pin $O^2$.

If the galvanometer pointer $e$ is not in its neutral position when engaged by the lever N, but is at the left, or low side of neutral, the lever M will then be adjusted counter-clockwise into engagement with the pointer by the pin $O^2$. Such adjustment will move the flapper valve $d$ away from the nozzle $D^2$, thereby lowering the pressure in the chamber $F'$. This permits the segment G to turn clockwise under the action of the spring $G^2$, and effects a counter-clockwise adjustment of the cam member H. The angular adjustment of the latter gives an angular adjustment to the lever K which, through its engagement with the lever N, gives a return or clockwise adjustment to the lever M, permitting the flapper $d$ to move back toward the nozzle $D^2$. This return movement of the flapper valve $d$, restores the pressure in the chamber $F'$ to its approximately constant normal value, and arrests the movement of the member G and cam H.

Conversely, with the pointer $e$ at the high, or right hand side of neutral, the pointer when engaged by the lever N, engages the lever M, if the latter is then in or near its neutral position, and turns the lever M clockwise. In this case, the corresponding operative engagement of the pin $O^2$ with the lever M will not change the angular position of the latter. The clockwise adjustment of the lever M effected by the lever N, as just described, will permit the flapper $d$ to approach the nozzle $D^2$ and thereby increase the pressure in the chamber $F'$. In consequence, the segment G will then begin to move counter-clockwise, and will produce a corresponding clockwise adjustment of the cam member H and contact $H^5$. The angular adjustment of the member H thus produced gives an angular adjustment in the clockwise direction to the lever K, which permits of a corresponding counter-clockwise adjustment of the lever L under the action of the spring $L^2$, with a corresponding counter-clockwise adjustment of the lever M, and return movement of the flapper valve $d$ away from the nozzle $D^2$. The pressure in the chamber $F'$ is thereby reduced to its approximately constant normal value, and the movements of the segment G and cam H are thereby arrested.

As will be readily apparent, in the flapper valve $d$ adjustments effected by angular adjustment of the lever K, the levers L and M turn together. In adjustments of the flapper valve $d$ effected through the action of the lever O on the lever N or lever M, the latter is given an adjustment movement relative to the lever L. The latter is then prevented from moving with the lever N, by the lever K or spring L², the latter being strong enough to cause the frictional connection between the levers L and M to yield and permit movement of the lever M relative to the lever L.

Regardless of the direction of adjustment of the member H, effected as described, the adjustment movement of the members G and H will terminate when the cam H, acting through the lever K and levers K, L, and M, returns the flapper valve d to its neutral position in which it establishes the approximately constant pressure in the chamber F' necessary to balance the force with which the spring G acts on the wall F². The instrument parts are advantageously so proportioned that the flapper valve neutral position corresponds to the neutral position of the lever M, in which, with the pointer e in its neutral position, the oscillation of the lever P will not result in a change in the angular position of the lever M.

The edge portion M² of the lever M should be so shaped, that any angular adjustment of the lever M, effected by, and on the oscillation of the lever P, will increase with the extent of pointer deflection from neutral, to the end that a relatively wide pointer deflection will effect an angular adjustment of the cam member H greater than is effected when the pointer deflection is relatively small. This variation in angular adjustment of the member H in accordance with the extent of pointer deflection, serves the double purpose of returning the lever M to its normal or neutral position, regardless of the extent of its immediately previous displacement therefrom, and of making the potentiometer rebalancing adjustment of the contact H⁵ larger or smaller, accordingly, as a larger or smaller adjustment is needed to rebalance the potentiometer.

Because of time lag, friction and varying rates of change in the E. M. F. measured, it is not possible to so proportion and calibrate the apparatus, that each rebalancing operation will always completely rebalance the potentiometer circuit, or return the member M exactly to its neutral position, but the approximation in each case will be sufficiently close for practical purposes in practically all ordinary uses of the instrument. The importance of the return of the member M to its exact neutral position at the end of each rebalancing operation, is minimized by the fact that slight variations in that position, and slight variations from neutral of the galvanometer pointer, can result, with the apparatus shown, in slight adjustments, only, of the flapper valve d and contact H.

While the fluid pressure element F is itself a fluid pressure motor, it is proper, and may be convenient, to regard the element F and the member G with its spring G² as collectively constituting a reversible motor for which the flapper valve f is the controller, said motor being energized for action in one direction by increasing the air pressure in the chamber F', and being energized for operation in the other direction by decreasing said pressure, and being deenergized by returning said pressure to the intermediate value required to balance the spring G². As has been made clear, each energization of the motor is initiated by an adjustment of the flapper valve d, away from a normal position of the latter, which is effected by mechanical relay provisions, including the cam CA, which are controlled by the deflection of the galvanometer pointer e. Each energization of the motor, so initiated, is terminated by, and at the conclusion of the operation of the motor, effecting such adjustment of the lever K as is required to return the flapper valve f to its said normal position. If and when desirable, the action of the motor element F may be retarded by partially closing a throttle valve D³, or other flow regulating device in the compressor discharge piping. As will be apparent to those skilled in the art, many changes may be made in the form of the apparatus previously described, and particularly in respect to the mechanical provisions for adjusting the flapper valve D, and some of those changes are illustrated by way of example in Figs. 5, 6, and 7.

The arrangement shown in Fig. 5, differs from that previously described, in that the above described lever O is replaced in Fig. 5 by a lever OA and the lever P is replaced by lever PA. The lever OA differs from the lever O in that its arm carrying the pin O² is appreciably longer than its arm carrying the pin O', so that when the lever P of Fig. 5 turns clockwise, the leverage with which it acts on the lever N through the pin O', is appreciably greater than the leverage with which the pin O² can act on the lever M. The lever PA differs from the lever P in that the distance separating the axes of pivots OPA and A⁷ is greater than the distance separating the axes of pivots OP and A⁷ and the former is greater than the distance separating the axes of pivots A⁸ and A⁷. A clockwise turning movement about pivot A⁸ is thereby produced upon clockwise rotation of lever P which is greater than the counterclockwise turning movement so produced. Furthermore, the lever OA has a clockwise gravitational bias and therefore in the construction of Fig. 5 the pin O' is brought into operative engagement with the lever N, and moves the latter into engagement with the stop A⁹, before the pin O² engages the lever M forcibly enough to move the latter counter-clockwise, if the position of the galvanometer pointer e is such as to require and permit such movement of the lever M. With the arrangement shown in Fig. 5, the bias spring OP' of Fig. 2 is unnecessary and is omitted.

In the arrangement shown in Fig. 6, the adjustment of the flapper valve d is adapted to effect such potentiometer rebalancing and flapper valve adjusting operations by the angular adjustment of a cam member HA as are effected with the instrument shown in Figs. 1, 2, and 3, by the adjustment of the member H, but in respect to the character of its flapper valve adjusting provisions, the arrangement of Fig. 6 differs in various ways from the arrangement first described. The flapper adjusting provisions of Fig. 6 includes lever elements KA, LA, MA, NA, corresponding generally to, but differing operatively in some respects from, the levers K, L, M, and N of the arrangement first described. In Fig. 6, the levers MA and NA are subject to periodical adjustment by a cam CA through levers PA and OA, exactly as the levers M and N are adjusted through the levers PA and OA shown in Fig. 4. In Fig. 6, however, the clockwise adjustment of the lever NA, bringing the latter into engagement with the galvanometer pointer e, moves the latter against a stationary abutment having a pointer engaging edge A¹⁰ parallel to the plane of pointer deflection, and the angular position of the lever NA when in clamping engagement with the pointer, varies with the deflection of the latter as a result of the formation of the lever NA with a pointer engaging edge N', which is specially shaped to serve the general purpose of the special shaping of the edge $M^2$ of the lever M in the arrangement first described.

In the arrangement shown in Fig. 6, the angular adjustment of the lever MA, following the clamping of the galvanometer pointer, varies with the deflective position of the latter as in the arrangement first described, but in Fig. 6, the lever MA does not directly engage the pointer, but has its position determined by the deflected position of the pointer, in consequence of the fact that at the end of the pointer clamping operation, a pin or portion $M^4$ of the lever M engages the lever NA, so that the angular position of the lever MA is then directly dependent upon the angular position at the time, of the lever NA. As shown in Fig. 6, each of the levers PA and LA is biased for clockwise adjustment by a connecting spring PL. The latter holds the lever LA in engagement at all times with a portion of the lever KA, shown as in the form of a laterally projecting pin $K^3$ carried by the lever KA, and mounted on the latter for adjustment radially of the stationary pivot $A^{11}$, on which the lever KA is pivoted intermediate the projection $K^3$ and the roller K' bearing on the cam edge $HA^3$ of the member HA. In Fig. 6, the lever KA engages the lever LA so as to positively adjust the lever LA in the counter-clockwise direction, and, when the lever KA is adjusted counter-clockwise, to permit a corresponding clockwise adjustment of the lever LA under the action of the bias spring PL. The lever KA is biased as by means of a spring $K^5$ for clockwise adjustment, so that its roller K' is held at all times in engagement with the cam edge $HA^3$. That cam edge is spiral, but is reversed so to speak, with reference to the spiral cam edge $H^3$ of the member H, so that as the member HA turns clockwise or counter-clockwise in its potentiometer rebalancing adjustments, the lever KA is turned counter-clockwise or clockwise, respectively.

The general operation of the arrangement shown in Fig. 6, may be substantially the same as that of the arrangement first described, the levers LA and MA being like the levers L and M previously described in respect to their frictional connection and in their movements together, and relatively to one another. Aside from the differences in lever form and arrangement, the construction of Fig. 6 differs operatively from the front construction first described, in that its galvanometer pointer clamping operation is somewhat less subject to lost motion disturbances, and has even less tendency to subject the pointer to shock and wear.

The arrangement shown in Fig. 7 includes parts CB, KB, LB, MB, NB, OB, and PB, which may be similar in form and in their coaction to the parts CA, KA, LA, MA, NA, OA, and PA of Fig. 7, except as hereinafter pointed out. The principal different between the arrangement shown in Fig. 7, and that shown in Fig. 6, is that the levers LB, MB, and NB are so arranged and have their common pivot $A^{30}$ so disposed, with reference to the path of deflection of the galvanometer pointer, that the portion of the lever NB engaging the pointer is generally transverse both to the length of the pointer and its plane of deflection, and engages a side edge of the pointer, in a direction tending to move the latter along the stationary abutment edge $A^{10}$, instead of in a direction to clamp the pointer against the last mentioned edge.

To prevent the pointer displacement along the edge $A^{10}$ when engaged by the lever NB, an auxilliary clamping lever Q is provided. The latter has its pointer engaging edge generally parallel to the edge $A^{10}$ when in its pointer engaging position, and is biased for movement in the clamping direction about its pivot Q' by a spring $Q^2$ except when the position of the cam notch CB' is such as to permit the entrance therein of the projection $PB^3$ of the lever PB. The lever Q is held out of engagement with the galvanometer pointer by a link $Q^3$, pivotally connected at one end to the lever Q, and at its other end to the lever PB, one of the two pivotal connections being a pin and slot connection. As shown, said pin and slot connection is formed by a pin $PB^4$ carried by the lever PB and received in a slot formed for the purpose in the corresponding end of the link $Q^3$. The pin and slot connection permits the lever PB to hold the lever Q out of clamping engagement with the pointer, when the projection $PB^3$ is riding on the un-notched portion of the edge of the cam CB, and prevents the lever PB from exerting a thrust on the lever Q in the pointer clamping direction, when the projection $PB^3$ enters the notch CB'. The clamping force exerted by the lever Q on the pointer is thus determined by the spring $Q^2$. With the arrangement shown in Fig. 7, the cam notch CB' may well have a somewhat greater depth than is required in the case of the cam notch CA' of the constructions previously described.

The adjustments given the lever MB, and the effect of those adjustments on the flapper valve $d$, and on the apparatus controlled by the latter, may be exactly the same as the effect of the adjustments of the levers M and MA of the constructions previously described. The cam edge $HB^3$ of the member HB, may be similar in shape and disposition to the cam edge $HA^3$ of the lever HA of Fig. 6.

In any instrument comprising a pneumatic power device or relay mechanism for adjusting some instrument device or mechanism in accordance with the movements of a sensitive movable measuring element, there are certain general advantages in placing the compressor, supplying air under pressure for the actuation of the power device or relay mechanism, in the instrument casing, so that the air compressed and used may be continuously held within the casing, and hence does not require filtering or give rise to difficulties as a result of the condensation of water vapor mixed with the air, or as a result of pressure drop and time lag due to the flow of the pressure air through elongated piping supplying air to the instrument from an external source of compressed air. The conception of an arrangement of the compressor within an instrument casing to obtain the general advantages just mentioned, did not originate with me, but with Roy Ullman, and is disclosed and claimed in his application, Serial No. 82,859, filed of even date herewith which has matured into Patent Number 2,172,599, dated September 12, 1939. In combining an air compressor within the instrument casing with potentiometer rebalancing mechanism including the type of pneumatic relay mechanism disclosed and claimed herein, I obtain special advantages, however, in the way of mechanical simplification and compactness, as well as from the relatively small volume of compressed air which needs to be compressed for the operation of said mechanism.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a self-balancing potentiometer, the combination with a galvanometer adapted to deflect in response to potentiometer unbalance, a potentiometer rebalancing power device, a controller for said device, means controlled by the galvanometer deflection for adjusting said controller to set said power device into operation, and means through which said power device, when set in operation, mechanically readjusts said controller and thereby directly interrupts the operation of said power device.

2. In a self balancing potentiometer, the combination with a galvanometer adapted to deflect from a neutral position in response to potentiometer unbalance, fluid pressure rebalancing means adapted to be set into operation in one direction or the other by an increase in the fluid pressure above, or a decrease in said pressure below, respectively, a certain intermediate value of the latter, and to have said operation terminate when said pressure is restored to said intermediate value, a valve regulating said pressure, periodically operating means for adjusting said valve to increase or decrease said pressure accordingly as the galvanometer deflection is in one direction or the other from said neutral position, and means actuated by the operation of the first mentioned means to readjust said valve and restore said pressure to its said intermediate value.

3. In a self balancing potentiometer, the combination with a galvanometer adapted to deflect from a neutral position in response to potentiometer unbalance, fluid pressure rebalancing means adapted to be set into operation in one direction or the other by an increase in fluid pressure above, or a decrease in said pressure below, respectively, a certain intermediate value of the latter, and to have said operation terminated when said pressure is restored to said intermediate value, a valve adapted to regulate said pressure, periodically operating means adapted to adjust said valve to increase or decrease said pressure accordingly as the galvanometer deflection is in one direction or the other from said neutral position, and means adapted to be actuated by the operation of the first mentioned means to readjust said valve and restore said pressure to its said intermediate value, after an extent of operation of said rebalancing means dependent on the extent of the first mentioned adjustment of said valve.

4. In a self balancing potentiometer instrument, the combination with a galvanometer adapted to deflect in response to potentiometer unbalance, a movable potentiometer rebalancing device, pneumatic actuating means for said device, valve means controlling said actuating means, means controlled by the galvanometer deflection adapted to periodically adjust said valve means from a neutral position in one direction or the other and thereby effect a movement of said device in one direction or the other, and means actuated by the resultant movement of said device to return said valve means to its neutral position, and thereby check the movement of said device.

5. In a self balancing potentiometer, the combination with a galvanometer adapted to deflect from a neutral position in response to potentiometer unbalance, movable fluid pressure rebalancing mechanism including a fluid pressure chamber and adapted to be set into operation in one direction, or in the opposite direction, by an increase or a decrease, respectively, in the fluid pressure in said chamber, a valve regulating said pressure, periodically operating means for adjusting said valve to increase or decrease said pressure accordingly as the galvanometer deflection is in one direction or the other from said neutral position, and means through which the resultant operation of said mechanism readjusts said valve and terminates said operation.

6. In a self balancing potentiometer, the combination with a galvanometer adapted to deflect from a neutral position in response to potentiometer unbalance, movable rebalancing mechanism including a fluid pressure chamber and biased for movement in one direction and adapted to be actuated in said one direction, or in the opposite direction, by a decrease in fluid pressure below, or an increase in said pressure above, respectively, a certain intermediate value of the latter, a valve regulating said pressure, periodically operating means for adjusting said valve to increase or decrease said pressure accordingly as the galvanometer deflection is in one direction or the other from said neutral position, and means actuated by said mechanism to readjust said valve and restore said pressure to its said intermediate value.

7. In a self-balancing potentiometer, the combination with a galvanometer adapted to deflect in respect to potentiometer unbalance, an angularly adjustable rebalancing element, a fluid pressure motor including a part given to and fro movements by changes in the fluid pressure acting on said motor, means connecting said part and element whereby the latter is angularly adjusted in accordance with the movement of said part, and valve means jointly controlled by the deflection of said galvanometer and the angular adjustment of said element for regulating said pressure.

8. In a self-balancing potentiometer, the combination with a galvanometer adapted to deflect in respect to potentiometer unbalance, an angularly adjustable rebalancing element, including a cam, a fluid pressure motor including a part given to and fro movements by changes in the fluid pressure acting on said motor, means connecting said part and element whereby the latter is angularly adjusted in accordance with the movement of said part, and valve means jointly controlled by the deflection of said galvanometer and by the angular adjustment of said cam for regulating said pressure.

9. In a self-balancing potentiometer, the combination with a galvanometer adapted to deflect in response to potentiometer unbalance, a rebalancing element including a spur gear and angularly adjustable about the axis of said gear, a toothed member having its teeth in mesh with the teeth of said gear, a fluid pressure motor including a movable part connected to said toothed member to give the latter to and fro movements as the fluid pressure acting on said part is varied, and valve means jointly controlled by deflection of said galvanometer and the angular adjustment of said element for regulating said pressure.

10. In a self-balancing potentiometer, the combination with a galvanometer adapted to deflect from a neutral position in response to potentiometer unbalance, fluid pressure potentiometer rebalancing means adapted to be set into operation in one direction or the other by an increase or decrease, respectively, in the fluid pressure acting on said means, a valve regulating said pressure, periodically operating means including relatively adjustable parts yieldingly held in fixed relation to one another for adjusting said valve to increase or decrease said pressure accordingly as the galvanometer deflection is in one direction or the other from said neutral position, for adjusting one of said parts relative to the other in accordance with the extent of operation of said rebalancing means.

11. The combination with a member deflecting in accordance with the changes in value of a measurable quantity, an adjustable element and means for giving said element adjustments proportional to the deflections of said member, said means comprising a fluid pressure motor, a valve controlling the operation of said motor, and valve operating mechanism including a valve operating part and a second part yieldingly held in fixed relation to the first mentioned part, means for adjusting said valve operating part in accordance with the deflection of said member and for relatively adjusting said parts in accordance with the then existing adjustment position of said element, and means for adjusting said second part and thereby the first mentioned part, on, and in accordance with the extent of, the adjustment of said element resulting from the first mentioned adjustment of said valve operating part.

12. The combination with a deflecting member, of a relay mechanism, and means through which said mechanism is selectively controlled in accordance with the deflection of said member, said means comprising two levers having a common fulcrum axis, power means acting periodically on each lever tending to turn it toward the other and thereby bring one, at least, of said levers into engagement with said member, and means positively limiting the extent of movement of each lever toward the other.

13. The combination with a deflecting member, of a fluid pressure relay mechanism, and means through which said mechanism is selectively controlled in accordance with the deflection of said member, said means comprising two levers having a common fulcrum axis, power means acting on each of said levers tending to turn it toward the other and thereby bring one, at least, of said levers into engagement with said member, means positively limiting the extent of movement of one part toward the other, and a control valve adjusted by one of said levers.

14. The combination with a deflecting member, of a fluid pressure relay mechanism, and means through said mechanism is selectively controlled in accordance with the deflection of said member, said means comprising two levers having a common fulcrum axis, power means acting on each of said levers tending to turn it toward the other and thereby bring one, at least, of said levers into engagement with said member, means positively limiting the extent of movement of one part toward the other, a control valve adjusted by one of said levers, and a part adjustably connected to the last mentioned lever and adapted to be adjusted relatively to the latter by said power means to an extent controlled by said mechanism and through which the operation of said mechanism readjusts said valve.

15. The combination with a deflecting member, of a relay mechanism, and means through which said mechanism is controlled in selective accordance with the deflection of said member, said means comprising one lever pivoted to turn about a fulcrum axis toward and away from a position in which said lever engages said member, a second lever pivoted to turn about said axis toward and away from the first mentioned lever, means acting between said two levers to limit the approach of the second lever to the first mentioned lever, an actuating lever having an engaging part at one side of said axis for engaging the first mentioned lever and having an engaging part at the opposite side of said axis for engaging the second lever, and means pivotally connected to said actuating lever, between the said engaging parts thereof, and adapted to move said actuating lever toward and away from said axis.

16. The combination with a deflecting member, of a relay mechanism, and means through which said mechanism is controlled in selective accordance with the deflection of said member, said means comprising one lever pivoted to turn about a fulcrum axis toward and away from a position in which said lever engages said member, a second lever pivoted to turn about said axis toward and away from the first mentioned lever, means acting between said two levers to limit the approach of the second lever to the first mentioned lever, an actuating lever having an engaging part at one side of said axis for engaging the first mentioned lever and having an engaging part at the opposite side of said axis for engaging the second lever, and means pivotally connected to said actuating lever, between the said engaging parts thereof, and adapted to move said actuating lever toward and away from said axis, said one and second levers being each biased for movement about said axis away from the other.

17. The combination with a deflecting member, of a relay mechanism, and means through which said mechanism is controlled in selective accordance with the deflection of said member, said means comprising one lever pivoted to turn transversely to said member and its plane of deflection about a fulcrum axis toward and away from a position in which said lever engages said member, a second lever pivoted to turn about said axis toward and away from the first mentioned lever, means acting between said two levers to limit the approach of the second lever to the first mentioned lever, an actuating lever having an engaging part at one side of said axis for engaging the first mentioned lever and having an engaging part at the opposite side of said axis for engaging the second lever, and means pivotally connected to said actuating lever, between the said engaging parts thereof, and adapted to move said actuating lever toward and away from said axis.

18. The combination with a deflecting member, of a relay mechanism, and means through which said mechanism is controlled in selective accordance with the deflection of said member, said means comprising an abutment, one lever pivoted to turn about a fulcrum axis toward and away from a position in which said lever engages said member and clamps the latter against said abutment, a second lever pivoted to turn about said axis toward and away from the first mentioned lever, means acting between the two levers to limit the approach of the second lever to the first mentioned lever, an actuating lever having an engaging part at one side of said axis for engaging the first mentioned lever and having an engaging part at the opposite side of said axis for engaging the second lever, and means pivotally connected to said actuating lever, between the said engaging parts thereof, and adapted to move said actuating lever toward and away from said axis.

19. In a self balancing potentiometer instrument, the combination with an instrument housing of mechanism therein comprising a galvanometer adapted to deflect from a neutral position in response to potentiometer unbalance, pneumatic rebalancing means adapted to be set into operation in one direction or the other by an increase in air pressure therein above, or a decrease in said pressure below a certain intermediate value of the latter, and to have said operation terminated when said pressure is restored to said intermediate value, a valve adapted to regulate said pressure by regulating the discharge of air from said rebalancing means into the housing space, periodically operating means adapted to adjust said valve to increase or decrease said pressure accordingly as the galvanometer deflection is in one direction or the other from said neutral position, means adapted to be actuated by the operation of the first mentioned means to readjust said valve and restore said pressure to its said intermediate value, after an extent of operation of said rebalancing means dependent on the extent of the first mentioned adjustment of said valve, and a compressor drawing air to be compressed from said housing space and delivering the compressed air to said rebalancing means.

20. The combination with a member deflecting in accordance with variations in the value of a variable condition, of fluid pressure relay mechanism including a fluid pressure chamber and a movable part biased for movement in one direction and adapted for movement in said direction or in the opposite direction by a decrease or an increase, respectively, in the pressure in said chamber below or above a predetermined value of said pressure, a valve regulating said pressure, periodically operating means for adjusting said valve to increase or decrease said pressure accordingly as said member deflects in one direction or the other, and means actuated by the movement of said part to readjust said valve and restore said pressure to its said predetermined value.

21. The combination with a deflecting member of an element and means through which said element is selectively controlled in accordance with the deflection of said member, said means comprising two levers extending at opposite sides of said member and each pivoted for movement toward and away from said member and the other lever, and means for giving said levers movements toward said member and one another and thereby moving one at least of said levers into engagement with said member, comprising a part having displaced portions respectively engaging the two levers and means acting on said part intermediate said portions.

22. The combination with a deflecting member of an element and means through which said element is selectively controlled in accordance with the deflection of said member, said means comprising two levers extending at opposite sides of said member and each pivoted for movement toward and away from said member and the other lever, means for giving said levers movements toward said member and one another and thereby moving one of said levers into engagement with said member, comprising a part having displaced portions respectively engaging the two levers, means acting on said part intermediate said portions, means positively arresting movement toward the other lever of said one lever on the engagement of the latter with said member, and means through which the movement of said other lever toward said one lever is interrupted by the latter.

23. The combination with a deflecting member, of an element and means through which said element is selectively controlled in accordance with the deflection of said member, said means comprising a lever pivoted to turn into and back from a position of engagement with said member which is selectively dependent upon the deflection of said member, a second lever pivoted coaxially with the first mentioned lever to turn into and back from a position of engagement with the first mentioned lever when the latter is in the first mentioned position, whereby said second mentioned position is selectively dependent on the deflection of said member, and means for moving said levers into and back from their respective engagement positions.

24. The combination with a deflecting member, of an element and means through which said element is selectively controlled in accordance with the deflection of said member, said means comprising a lever pivoted to turn into and back from a position of engagement with said member which is selectively dependent upon the deflection of said member, a second lever pivoted coaxially with the first mentioned lever to turn into and back from a position of engagement with the first mentioned lever when the latter is in the first mentioned position, whereby said second mentioned position is selectively dependent on the deflection of said member, means for moving said levers into and back from their respective engagement positions, and means opposing movement of said member by the first mentioned lever.

25. The combination with a deflecting member, of an element and means through which said element is selectively controlled in accordance with the deflection of said member, said means comprising a lever pivoted to turn into and back from a position of engagement with said member which is selectively dependent upon the deflection of said member, a second lever pivoted to turn into and back from a position of engagement with the first mentioned lever when the latter is in the first mentioned position, whereby said second mentioned position is selectively dependent on the deflection of said member, means for moving said levers into and back from their respective engagement positions, and means separate from said levers for holding said member stationary while engaged by the first mentioned lever.

26. The combination with a deflecting member, of an element and means through which said element is selectively controlled in accordance with the deflection of said member, said means comprising a lever pivoted to turn into and back from a position of engagement with said member which is selectively dependent upon the deflection of said member, a second lever pivoted coaxially with the first mentioned lever to turn into and back from a position of engagement with the first mentioned lever when the latter is in the first mentioned position, whereby said second mentioned position is selectively dependent on the deflection of said member, means for moving said levers into and back from their respective engagement positions, and a stationary abutment against which said member is clamped by the first mentioned lever and thereby held stationary, while engaged by the first mentioned lever.

27. In a self-balancing potentiometer, the combination with a galvanometer adapted to deflect in response to potentiometer unbalance, a potentiometer rebalancing power device, a controller for said device, means controlled by the galvanometer deflection for adjusting said controller to set said power device into operation, and means actuated by said power device operation for adjusting said controller to interrupt said operation after an extent thereof in predetermined relation to the extent of said deflection initiating said operation.

COLEMAN B. MOORE.